(12) United States Patent
Beckett (10) Patent No.: US 11,555,733 B2
(45) Date of Patent: Jan. 17, 2023

(54) APPARATUS FOR DETERMINING A VERTICAL LEVEL OR DENSITY PROFILE OF A FLUID COLUMN

(71) Applicant: JOHNSON MATTHEY PUBLIC LIMITED COMPANY, London (GB)

(72) Inventor: Oliver John Beckett, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 20 days.

(21) Appl. No.: 17/271,425

(22) PCT Filed: Sep. 23, 2019

(86) PCT No.: PCT/GB2019/052659
§ 371 (c)(1),
(2) Date: Feb. 25, 2021

(87) PCT Pub. No.: WO2020/070469
PCT Pub. Date: Apr. 9, 2020

(65) Prior Publication Data
US 2021/0199486 A1 Jul. 1, 2021

(30) Foreign Application Priority Data

Oct. 1, 2018 (GB) .................................... 1816011

(51) Int. Cl.
*G01F 23/36* (2006.01)
*G01N 9/18* (2006.01)
*G01F 25/20* (2022.01)

(52) U.S. Cl.
CPC ............ *G01F 23/363* (2013.01); *G01F 25/22* (2022.01); *G01N 9/18* (2013.01)

(58) Field of Classification Search
CPC .......... G01F 23/58; G01F 23/363; G01N 9/18
(Continued)

(56) References Cited

U.S. PATENT DOCUMENTS 2,038,273 A * 4/1936 Eynon ................. G01F 23/0038
73/309
2,592,569 A * 4/1952 Henderson ................ G01F 1/20
177/208

(Continued)

FOREIGN PATENT DOCUMENTS

CN 1967174 A 5/2007
EP 0886128 A1 12/1998
(Continued)

*Primary Examiner* — John Fitzgerald
(74) *Attorney, Agent, or Firm* — BakerHostetler (57) ABSTRACT

Provided herein is an apparatus for determining a vertical density profile of a multi-layered fluid column including at least two different liquids, the apparatus comprising
a plurality of measurement modules that form a vertical array of measurement modules;
wherein each measurement module comprises:
a support arm mounted to the elongate vertical support member and extending outwardly from the elongate vertical support member;
a displacer carried on the support arm; and
a force measurement device configured to measure a force attributable to a mass of the displacer mediated by a buoyancy of the displacer in the fluid column,
wherein the plurality of measurement modules have a data connection to a data processing unit
that is configured to process the measurement data from the plurality of measurement modules and generate a level or density profile of the fluid column.

27 Claims, 4 Drawing Sheets

(58) Field of Classification Search
USPC .......................................................... 73/311
See application file for complete search history.

(56) References Cited

U.S. PATENT DOCUMENTS

| | | | |
|---|---|---|---|
| 4,483,192 A | | 11/1984 | Wachter |
| 4,625,553 A | * | 12/1986 | Charter .................... G01N 9/26 73/438 |
| 5,026,984 A | | 6/1991 | Gerdt et al. |
| 5,325,716 A | * | 7/1994 | Hafner .................. G01F 23/185 73/299 |
| 5,408,874 A | * | 4/1995 | Fleck, Sr. ............... G01F 23/76 367/908 |
| 5,614,672 A | | 3/1997 | Dore |
| 5,744,716 A | * | 4/1998 | Mimken .................. G01N 9/20 73/309 |
| 5,847,276 A | * | 12/1998 | Mimken .................. G01N 9/20 73/309 |
| 5,942,684 A | * | 8/1999 | Sahm ....................... G01N 9/20 62/50.7 |
| 5,942,980 A | | 8/1999 | Hoben et al. |
| 6,282,953 B1 | * | 9/2001 | Benjey ................ B60K 15/077 73/299 |
| 8,141,421 B2 | * | 3/2012 | Paine .................. G01F 23/0038 73/309 |
| 9,297,686 B1 | * | 3/2016 | Ross, Jr. ............... G01F 23/263 |
| 10,947,843 B2 | * | 3/2021 | Jamison .................. E21B 49/08 |
| 2008/0053202 A1 | | 3/2008 | Rohklin et al. |
| 2011/0277546 A1 | * | 11/2011 | Armitage ................ G01F 23/44 73/311 |
| 2012/0260729 A1 | * | 10/2012 | Bayley .................. G01F 23/363 73/307 |
| 2015/0300864 A1 | | 10/2015 | Wiebe |
| 2016/0091357 A1 | | 3/2016 | Hedtke |
| 2017/0075363 A1 | * | 3/2017 | Steinke .................. F04D 13/08 |
| 2018/0223658 A1 | * | 8/2018 | Jamison .................. E21B 49/08 |

FOREIGN PATENT DOCUMENTS

| | | |
|---|---|---|
| GB | 1524303 A | 9/1978 |
| GB | 2190500 A | 11/1987 |
| JP | S62276436 A | 12/1987 |
| WO | 00/22387 A1 | 4/2000 |
| WO | 2009/089339 A2 | 7/2009 |
| WO | 2013/024301 A2 | 2/2013 |
| WO | 2018/162541 A1 | 9/2018 |

\* cited by examiner

APPARATUS FOR DETERMINING A VERTICAL LEVEL OR DENSITY PROFILE OF A FLUID COLUMN

FIELD OF THE INVENTION

The present invention relates to a measurement system, apparatus and method for the measurement of a level and/or density of a material within a defined volume and to a system, apparatus and method for detecting the location of an interface between different materials contained in a defined volume.

BACKGROUND

Level and density measurement systems, for example for use in measuring the level and/or density of a material within a vessel or other defined volume, are well known. It is also known to locate the boundaries between different materials in a vessel by measuring the density of the vessel contents at different locations to form a density profile of the vessel and contents in order to identify density changes which are indicative of boundary regions. For example, it has been proposed in WO 00/22387 to measure the density profile of a medium by providing an array of sources of gamma radiation to give collimated beams of said radiation and an array of detectors disposed so that the medium under study extends between the sources and the detectors. By monitoring the radiation received by the detectors, the amount of radiation absorbed by the medium from each beam can be determined and so variations in the medium density can be detected. One disadvantage of the system of WO 00/22387 is the need to employ radioactive materials which consequently imposes restrictions in use and/or health and safety issues in order to ensure safe working.

GB 1524303 describes an apparatus used to determine the boundary between liquids of different densities by means of an elongated member along the length of which a series of housings is disposed with spaces between each housing into which spaces the medium under study can enter through perforations in the wall of the elongated member. Each housing comprises an ultrasonic transmitter and detector and the end of each housing acts as a reflector to reflect waves from the transmitter of the next adjacent housing back, through the medium in the space between the housings, to that next adjacent housing. One disadvantage of this type of arrangement is that the vertical resolution is limited by the need to provide a vertical space between each of the housings.

The aforementioned nucleonic and ultrasonic systems are capable of detecting the interface between two different liquids of different density.

It is also known to use mechanical systems to measure the level or density of a single liquid phase. Such devices use the buoyancy force on a float or displacer weight as a means of measuring the level or density of a liquid. Examples of such mechanical systems are briefly described below.

U.S. Pat. No. 5,614,672 describes apparatus for monitoring the liquid level in a sealed container, comprising: a load cell, located within a pressure housing mounted on an external pipe flange at the top of a sealed container having known cross section and containing a liquid of a known specific gravity; and a displacer weight of known weight and length passing through the pipe flange opening and suspended above the bottom of the container. The apparatus works on the principle that when there is no liquid in the tank, the load-cell and its meter system sense the maximum weight of a displacer cylinder which is the null or "zero" point for measurement. The buoyancy of the displacer weight in the liquid then reflects the volume in the container.

WO2018/162541 discloses a similar system to that described in U.S. Pat. No. 5,614,672. The system described in WO2018/162541 is for measuring the level of a liquid in a container, such as for measuring the level of a liquid beverage in a container at a bottling plant. The system comprises an elongate immersion body extending downwards into the container. The immersion body is connected via a connecting rod to a load cell. As the liquid fills the container, the buoyancy force on the elongate immersion body increases and this is detected by the load cell and used to determine the level of the liquid in the container.

US2015/0300864 discloses a liquid level sensor system for use as a fuel level sensor. A mechanical arm is disposed within a fuel tank, the arm constructed to have sufficient buoyancy to provide an upward force as fuel fills the tank. The arm is linked to a strain gauge mounted externally to the fuel tank to measure the force provided by the buoyant mechanical arm and determine the level of fuel in the tank.

EP0886128 discloses a sensor for measuring the density of a liquid mixture. The sensor comprises a float that exerts a buoyancy force that is dependent on the density of the liquid mixture. A load cell is used to measure the buoyancy force and the density of the liquid mixture is determined.

While the preceding prior art documents describe buoyancy sensor systems comprising a single float or displacer weight as a means of measuring the level or density of a liquid, it is also known to provide systems comprising a plurality of floats at different heights within a container so that a progressive liquid level can be determined. Examples of such systems are described in GB2190500 and U.S. Pat. No. 4,483,192.

GB2190500 discloses a sensor configuration in which several silicon strain gauge sensors are secured in the wall of a tube, each sensor having a float attached thereto and each sensor having a connector lead to an electronic processing unit. The changing level of liquid in the tube progressively provides the electronics with changing outputs from the respective silicon strain gauges so that a progressive liquid level can be determined by the electronics. It is described that this sensor configuration could be used as a fuel gauge sensor in a motor vehicle.

U.S. Pat. No. 4,483,192 discloses a similar configuration in which several strain gauge sensors are secured to the wall of a tube, each sensor having a float attached thereto and each sensor having connector leads to an electronic processing unit. Again, the changing level of liquid in the tube progressively provides the electronics with changing outputs from the respective strain gauges so that a progressive liquid level can be determined by the electronics. It is described that the sensor system is used for indicating the instantaneous water level in a closed vessel which contains water and steam. It is also described that the system can detect an intermediate zone of steam-water as the float members in this region will be in oscillation as a result of agitation in the intermediate zone between the steam and water zones and that a superposition of buoyancy and oscillation indicates the intermediate zone.

It is an aim of the present invention to provide an improved measurement system, apparatus and method for the measurement of a level or density of fluid materials.

It is an aim of the present invention to provide a measurement system, apparatus and method that does not require nucleonic sources.

SUMMARY OF INVENTION

Density and level profiling of complex multi-layered fluid columns such as those in oil separator vessels has previously been performed using nucleonic profilers as described in WO0022387. Such nucleonic density profilers have been widely used. However, the present inventors have realized that for certain applications it would be useful to provide an alternative to the use of such nucleonic devices.

As described in the background section, it is known to use mechanical systems to measure the level or density of a single liquid phase. Such devices use the buoyancy force on one or more floats or displacer weights as a means of measuring the level or density of a single layer of liquid.

The present invention proposes to extend the functionality of the simple mechanical/buoyancy devices to enable full vertical level and density profiling of the type previously achieved using nucleonic density profiler devices.

According to one configuration there is provided an apparatus for determining a vertical level/density profile of a fluid column (e.g. a multi-layered fluid column) including at least two different liquids (or a fluid column including at least one liquid with a varying solid content), the apparatus comprising:
- a support member (e.g. an elongate vertical support member); and
- a plurality of measurement modules spaced apart, and supported along, the elongate vertical support member to form a vertical array of measurement modules;

wherein each measurement module comprises:
- a support arm mounted to the elongate vertical support member and extending outwardly from the elongate vertical support member;
- a displacer carried on the support arm; and
- a force measurement device configured to measure a force attributable to a mass of the displacer mediated by a buoyancy of the displacer in the fluid column,
- wherein the plurality of measurement modules have a data connection to a data processing unit for transmitting measurement data from the plurality of measurement modules to the data processing unit, and
- wherein the data processing unit is configured to process the measurement data from the plurality of measurement modules and generate a level/density profile of the fluid column.

Such an apparatus combines several of the principles of prior art nucleonic density profiler devices with several of the principles of prior art mechanical/buoyancy level measurement devices.

According to one preferred configuration, in each of the measurement modules, the displacer is mounted to the support arm via the force measurement device and the force measurement device is contained within the displacer. Containing the force measuring device within the displacer has several advantages. First, force measurement devices mounted in this manner are protected by the buoyant displacers. Physical protection alleviates problems of force measurement devices becoming damaged during transportation, installation, and use of the apparatus. Furthermore, the force measurement devices can be sealed within the displacers such that they are not contacted and contaminated by fluids in use. Contamination of the force measurement devices can lead to inaccurate density profile results and/or failure of the apparatus.

Furthermore, by mounting the force measurement devices within the displacers, the mounting point between the displacers and the force measurement devices can be located at or about the centre of buoyancy of the displacers. Such a mounting configuration can reduce non-linear forces and again improve the accuracy of density profile results. For example, the apparatus can be configured such that each support arm extends between the centre of buoyancy of a displacer and the elongate vertical support member with each force measurement device located at the end of a support arm at the centre of buoyancy within the displacer. The force measurement device can be an elongate load cell, wherein a first end of the elongate load cell is mounted to the support arm and a second end of the elongate load cell is mounted to the displacer. Furthermore, the displacer can be configured such that its centre of buoyancy and its centre of mass are coincident.

Such modifications increase the sensitivity and accuracy of the apparatus for level and density profiling of complex multi-layered fluid columns when compared to more simple devices for measuring the level or density of a single liquid layer. Furthermore, such configurations reduce contamination and/or failure of the apparatus in complex multi-layered fluid columns. Further still, by sealing electronic components within the buoyant displacers, the apparatus has increased electrically safety for use in hazardous environments such as in oil and gas refineries.

To further reduce contamination and increase electrical safety, the data connection from the plurality of measurement modules to the data processing unit can be configured to pass along, and be housed within, the elongate vertical support member. As such, the electronics can be completely isolated from the fluid in which the apparatus is placed.

The mean density of the displacer may be chosen to be less than or greater than all or any of the fluids to be measured or the same as one of the fluids to be measured. Advantageously, the mean density of the displacer is approximately the same as the density of the fluids into which it is placed in use. This will improve sensitivity to small variations in density between different liquid layers such as oil and water. A particular problem associated with the use of physical structures within the fluid in a vessel is build-up of contaminant. The mean density of the displacer may also be chosen to match that of any anticipated build-up and thus mitigate its effect. For example, the mean density of the displacer may fall in the range 0.1 to 2 g/cm$^3$, 0.5 to 1.5 g/cm$^3$, or 0.8 to 1.0 g/cm$^3$ for oil/water separation where, for example, oil may contaminate the displacers.

Depending on end applications and desired functionality, various embodiments of the apparatus are envisaged. For example, for certain applications at least one of the displacers can be configured to have a different buoyancy to at least one of the other displacers. As such, the displacers could be tailored for different functions such as critical level signalling, trip systems, combinations of level and density information for trays in distillation columns, etc.

In addition to the provision of a vertical array of measurement modules, the measurement modules can also be spaced part from one another radially around the elongate vertical support member. This configuration can be used to reduce the vertical spacing between displacers and therefore increase the precision with which an interface between two fluid layers can be measured. The configuration can also give information about horizontal variations in density in addition to vertical variations in density.

The data processing unit can be configured to use the density profile to indicate the vertical level of each fluid layer within the multi-layered fluid column. The apparatus may also comprise one or more temperature sensors and/or one or more pressure sensors. Temperature and pressure corrections can be applied when processing the measurement data to generate a density profile. Additionally, or alternatively, density information can be combined with pressure and/or temperature information to give an indication of operating conditions within a vessel.

The apparatus as described herein can be used in complex multi-layered fluid systems such as oil/water separator vessels in refineries. As such, also provided is a system comprising an oil/water separator vessel and an apparatus as described herein disposed within the oil/water separator vessel.

Also described herein is a method of determining a vertical density profile of a fluid column including at least two different liquids or a fluid column including at least one liquid with a varying solid content, the method comprising:
  introducing the apparatus as described herein into the fluid column;
  measure a force attributable to the mass of the displacer mediated by the buoyancy of the displacer in the fluid column at each of the measurement modules;
  transmitting measurement data from the plurality of measurement modules to a data processing unit, and
  processing the measurement data from the plurality of measurement modules to generate a level or density profile of the fluid column.

The apparatus may be introduced into the fluid column so as to be in a fixed location within the fluid column or may be moved within the fluid column. For example, the apparatus may be moved upwards and/or downwards along the fluid column. In this case, it is also possible to provide an alternative configuration which comprises only a single measurement module. Such an apparatus comprises:
  a support member; and
  at least one measurement module;
  wherein the measurement module comprises:
  a support arm mounted to the support member and extending outwardly from the support member;
  a displacer carried on the support arm; and
  a force measurement device configured to measure a force attributable to a mass of the displacer mediated by a buoyancy of the displacer in the fluid column,
  wherein the measurement module has a data connection to a data processing unit for transmitting measurement data from the measurement module to the data processing unit, and
  wherein the data processing unit is configured to process the measurement data from the measurement module and generate a level or density profile of the fluid column.

In other respects, this configuration can include the same features as that of the multi-measurement module apparatus as previously described.

In addition to the above, it has also been found to be advantageous to provide the apparatus as described herein with an accelerometer. An accelerometer can be used to correctly orientate the apparatus (relative to gravity). Furthermore, if the apparatus is moved within the fluid column, acceleration of the apparatus will affect the force measurements attributable to the mass of the displacer mediated by buoyancy. An accelerometer can be used to detect any acceleration of the apparatus and compensate for this when generating a level or density profile.

DESCRIPTION OF THE DRAWINGS

Embodiments of the present invention will now be described, by way of example, and not in any limitative sense, with reference to the accompanying drawings, of which.

DETAILED DESCRIPTION

An apparatus for determining the level or density of a fluid material within a defined volume or location of an interface between two fluid materials within a defined volume may comprise:
  at least one level measurement module, the level measurement module comprising:
  an elongate displacer support arm locatable in the defined volume in use, and for example having a first end mountable in use in the defined volume and a second end;
  a displacer carried on the displacer support arm in association with the second end;
  a force measurement device in association with the displacer to measure a force attributable to a mass of the displacer mediated by a buoyancy of the displacer in any fluid in which it sits.

A method of determining the level or density of a fluid material within a defined volume or the location of an interface between two fluid materials within a vessel may comprise the steps of:
  inserting at least one level measurement module into said volume, the level measurement module comprising:
  an elongate displacer support arm;
  a displacer carried on the displacer support arm; a force measurement device in association with the displacer to measure a force attributable to a mass of the displacer mediated by a buoyancy of the displacer in any fluid within the defined volume;
  measuring a force on the force measurement device;
  drawing inferences therefrom regarding a fluid in the defined volume.

A method can thus be provided comprising the deployment of at least one level measurement module of the apparatus into a defined volume and its use to obtain information regarding a fluid, for example a level and/or density of a fluid and/or the presence of an interface between fluids of different density. The apparatus is adapted to effect such deployment in use.

Thus, the apparatus comprises a means to deploy at least one level measurement module into a defined volume in use. This is, for example, a means to mount at least one level measurement module in the defined volume in use, and for example to mount at least one level measurement module in a vessel in use. The elongate displacer support member is deployed to extend into the contained volume, for example generally horizontally, to deploy the displacer at a suitable location, for example in a fluid or at a fluid interface therein.

Conveniently in this respect, the apparatus further comprises an elongate member for insertion into said defined volume, said elongate member carrying at least one level measurement module as above described, positioned thereon via the displacer support arm extending outwardly from the elongate member.

In this case, the apparatus comprises an apparatus for determining the level or density of a fluid material or location of an interface between two fluid materials comprising:

an elongate member for insertion into a defined volume, said elongate member carrying at least one level measurement module, the level measurement module comprising:

a displacer support arm extending outwardly from the elongate member;

a displacer carried on the displacer support arm;

a force measurement device in association with the displacer.

In this case, the method comprises a method of determining the level or density of a fluid material or the location of an interface between two fluid materials comprising the steps of:

inserting an elongate member into a volume, said elongate member carrying at least one level measurement module, the level measurement module comprising:

a displacer support arm extending outwardly from the elongate member;

a displacer carried on the displacer support arm;

a force measurement device in association with the displacer;

measuring a force on the force measurement device;

drawing inferences therefrom regarding a fluid in the volume.

Alternatively, the elongate member of the level measurement module may be otherwise adapted to locate the level measurement module in position in the defined volume.

Described herein is a level or density measurement system, apparatus and method for the measurement of a level or density of a material within a vessel, the defined volume being the volume defined by the vessel, and discussion of the application of the invention to level measurement in a vessel is presented herein by way of example. However, the skilled person will readily appreciate that the principles of the invention may be applied to other defined volumes into which an apparatus in accordance with the principles of the invention could be deployed, for example including a cavity in a geological or structural formation.

The principle to be exploited by the invention is that of differential relative buoyancy of the displacer in different fluids. The differential relative buoyancy of the displacer produces a differential measurement in the force measurement device from which inferences may be drawn regarding a level and/or density of a fluid and/or the presence of an interface between fluids of different density at the location of the displacer.

To that end, the force measurement device is provided in association with the displacer in such manner as to be able to measure in use a force attributable to a mass of the displacer mediated by a buoyancy of the displacer in any fluid in which it sits.

The force measurement device may be mounted in association with or comprise a part of or be integrally formed with the displacer support arm to measure in use a force exerted by the displacer on the support arm attributable to a mass of the displacer mediated by a buoyancy of the displacer in any fluid in which it sits. For example, the force measurement device may be mounted between the displacer and the displacer support arm. Alternatively, the force measurement device may be mounted between the displacer support arm and the vertical elongate member. Alternatively, the force measurement device may be carried directly upon or formed integrally with the displacer.

The force measurement device can be located in a fluid to be monitored. In a possible arrangement the force measurement device may be contained in a fluid-proof housing. In a possible arrangement the displacer may be structured to define such a housing for the force measurement device or the force measurement device may be associated with the displacer in a common housing.

A suitable force measurement device comprises a load cell. Plural load cells may be provided in association with each displacer.

A displacer has a known mass m and a volume V. The weight of the displacer exerts a force (vertically downwards in use) of $m*g$. The fluid surrounding the displacer exerts a buoyancy force (upwards in use) on the displacer according to the volume of the displacer V (or the volume of the displaced fluid) and the density of the fluid $\rho$, of $\rho*V*g$. Each displacer in an apparatus is attached to one or more load cells or other force measurement devices. These measure the resultant force of the displacer's mass mediated by the buoyancy as $Fr=m*g-\rho*V*g$.

A density of the fluid may thereby be determined, or a change in density, for example at an interface or as a fluid level changes over time, may be detected as a change in the force at the load cell or other force measurement device without the need to determine a density as such. The average density may be calibrated directly or calculated as $r=(m*g-Fr)/(V*g)$.

A displacer which is partially covered by two or more phases will have a buoyancy force determined by the volume of each phase displaced and their respective densities. Interpolation or other techniques may be used to estimate the positions of the phase changes.

The force measurement device measures a force attributable to a mass of the displacer mediated by a buoyancy of the displacer in any fluid material in which it sits in use.

Certain configurations can be characterised by the way in which the force measurement device is mounted relative to the displacer. For example, a displacer can be carried on a displacer support arm extending outwardly from a vertical elongate member, and a force measurement device can be provided in association with each displacer, for example at the mounting between the displacer and the displacer support arm.

Advantageously, this means that the force attributable to a mass of the displacer mediated by a buoyancy of the displacer for an individual displacer may be measured directly, allowing for the provision of multiple displacers in a longitudinal array each of which may be separately addressed in parallel to give additional functionality. Such an arrangement of multiple separate parallel measurement modules in a longitudinal array is not possible in prior art systems that mount a strain gauge outside the vessel or other volume under test or at least above an expected maximum fluid level and measure a force attributable to displacement of one or more buoyant displacers at that level.

An elongate vertical support can thus be provided with an array of level measurement modules as above described disposed at intervals along at least part of its length. Thus, the apparatus comprises an elongate member for insertion into a vessel or other volume under test, said elongate member carrying a plurality of level measurement modules spaced apart from one another along at least a part of a longitudinal axis of the elongate member. In this way, a longitudinal array of level measurement modules is provided disposed along at least a part of the elongate member and thus a vertical array of level measurement modules is provided within a volume under test in use.

The number of level measurement modules in such an array may be varied dependent upon the size of the vessel or other volume under test, the depth of material and the resolution required.

The spacing between adjacent level measurement modules may vary along the length of the elongated member or may be constant.

The successive level measurement modules in such an array may be of identical or varying conformance and displacement properties.

Additionally, or alternatively, the apparatus may comprise an elongate member for insertion into said vessel or other volume under test, said elongate member carrying a plurality of level measurement modules spaced part from one another radially around the elongate member. In this way, a radial array of level measurement modules is provided disposed at a given point along the elongate member and thus a radial array of level measurement modules at a given height is provided within a vessel or other volume under test in use.

In certain configurations the apparatus can be provided with multiple vertical elongate members as above described each carrying one or more level measurement modules as above described.

Preferred features of a level measurement module embodying the principles of the invention are discussed herein. Except where the context clearly demands otherwise it will be understood that any module of a plural array of level measurement modules as above described may separately embody any such feature, and that members of an array of level measurement modules as above described may be identically or differently conformed as required for a given functionality.

Each level measurement module comprises a displacer support arm, in the preferred case extending outwardly from the elongate member; a displacer carried on the displacer support arm; a force measurement device such as a load cell associated with the displacer.

The displacer may be carried on the displacer support arm in that it is mounted on the support arm directly or indirectly. In a possible case a force measurement device may be mounted between the displacer and the displacer support arm.

The displacer is preferably carried at or towards an end of the support arm distal from its attachment to the elongate member.

The displacer is preferably mounted at or about its centre of buoyancy so as to minimize any non-linear forces in use.

The displacer may be solid and homogeneous. Alternatively, the displacer may have an inhomogeneous structure and, for example, comprise a shell enclosing an open volume or volumes which may be hollow and liquid, gas or vacuum filled.

The displacer has a mass and enclosed volume. The displacer thereby defines a centre of mass and a centre of buoyancy. Advantageously the displacer is configured such that its centre of buoyancy and its centre of mass are coincident, so that the two forces acting on the displacer in use are acting at the same point. Conveniently to effect this, the displacer may have a homogenous structure. Alternatively, where the displacer does not have a homogenous structure, for example in the case where the displacer comprises a shell enclosing an open volume or volumes, the structure is such as to create a homogeneous distribution of mass about a coincident centre of buoyancy/centre of mass.

The mean density of the displacer may be chosen to be less than or greater than all or any of the fluids to be measured or the same as one of the fluids to be measured.

Advantageously, the mean density of the displacer is approximately the same as the density of the fluids into which it is placed in use. This will improve sensitivity to small variations in density between different liquid layers such as oil and water. A particular problem associated with the use of physical structures within the fluid in a vessel is build-up of contaminant. The mean density of the displacer may also be chosen to match that of any anticipated build-up and thus mitigate its effect. For example, the mean density of the displacer may fall in the range 0.1 to 2 $g/cm^3$, 0.5 to 1.5 $g/cm^3$, or 0.8 to 1.0 $g/cm^3$ for oil/water separation where, for example, oil may contaminate the displacers.

The force measurement device may be of any form suitable to measure a force exerted by the displacer in use attributable to the mass of the displacer mediated by the buoyancy of the displacer in the fluid in which it sits.

The force measurement device is preferably a load cell.

A suitable load cell may include a plurality of strain gauges.

A suitable load cell may be elongate. In such a case references to mounting a load cell may be read as references to mounting one or other end of an elongate load cell. For example, a first end of the elongate load cell may be mounted to or mounted to form a part of the displacer support arm extending outwardly from the elongate member and a second end of the elongate load cell may be mounted to the displacer.

Certain configurations can be characterised by the way in which the load cell is mounted relative to the displacer. In accordance with described configurations, a displacer is carried on a displacer support arm extending outwardly from the elongate member, and a load cell is provided in association with each displacer and for example at the mounting between the displacer and the displacer support arm.

The apparatus may further comprise one or more temperature sensors to measure the temperature within the volume under test. Temperature measurement may be achieved using one or more sensors placed on or within the or each level measurement module. Additionally, or alternatively, a separate temperature probe may be provided.

The apparatus may further comprise one or more pressure sensors to measure the pressure within the volume under test. Pressure measurement may be achieved using one or more sensors placed on or within the or each level measurement module. Additionally, or alternatively, a separate pressure probe may be provided.

If required, in situ load cell calibration may be performed by physically actuating the free end of a load cell to one or more known positions, corresponding to known loads. This could be performed for example by means of an electromagnet and hard stops, or by use of a motor or solenoid.

The apparatus further comprises data processing means capable of receiving a measured force from the or each load cell and determining therefrom a characteristic of the fluid material at the location of the displacer with which the load cell is associated. The data processing means is for example capable of receiving a plurality of measured forces comprising a measured force from a plurality of load cells associated with a plurality of displacers and/or a plurality of successive measured forces successively measured over time from a load cell associate with a single displacer and determining therefrom a characteristic of the fluid material at the location of the displacer with which the load cell is associated. A characteristic of the fluid material may include a level and/or density of a fluid in the vessel or other volume under test and/or the presence of an interface between fluids of different density.

The or each fluid cell is provided in data communication with such a data processing means and for example includes a data communication link with such a data processing means to transmit a measured force from the load cell to the data processing means. The data communication link may be wired or wireless. A particular advantage of configurations as described herein is that multiple displacers may be provided with parallel data communication links for parallel processing of their respective measured force data.

It will be appreciated that features described in relation to one aspect of the invention may be equally applicable to other aspects of the invention. For example, features described in relation to an apparatus of the invention may be equally applicable to a method of the invention and vice versa. It will also be appreciated that optional features may not apply, and may be excluded from, certain aspects of the invention.

The invention may find particular utility in conjunction with an oil/water separator vessel. Thus an oil/water separator may be provided with an inlet for an oil/water mixture and separate outlets for separated oil and water phases and provided with a monitoring apparatus in accordance with the invention, the elongate member thereof being disposed substantially vertically in the vessel with at least one level measurement module carried on the elongate member and in a preferred case an array of level measurement modules disposed along a length of the elongate member embracing the expected oil/water boundary. Thus a level or density and in the preferred case a density profile may be measured. The rates of flow to the inlet and/or from the outlets may be controlled in response to the monitored levels of the oil/water and/or gas/liquid boundaries.

Normally, the number of phases present in a vessel and their approximate composition is known and this information may be used to interpret the information gained from an apparatus of the invention. For example, the phases in an oil separator would be expected to include oil, water, gas and probably an oil/water emulsion, a foam and possibly a heavy phase at the bottom of the vessel containing sand or other solids.

Figure 1:
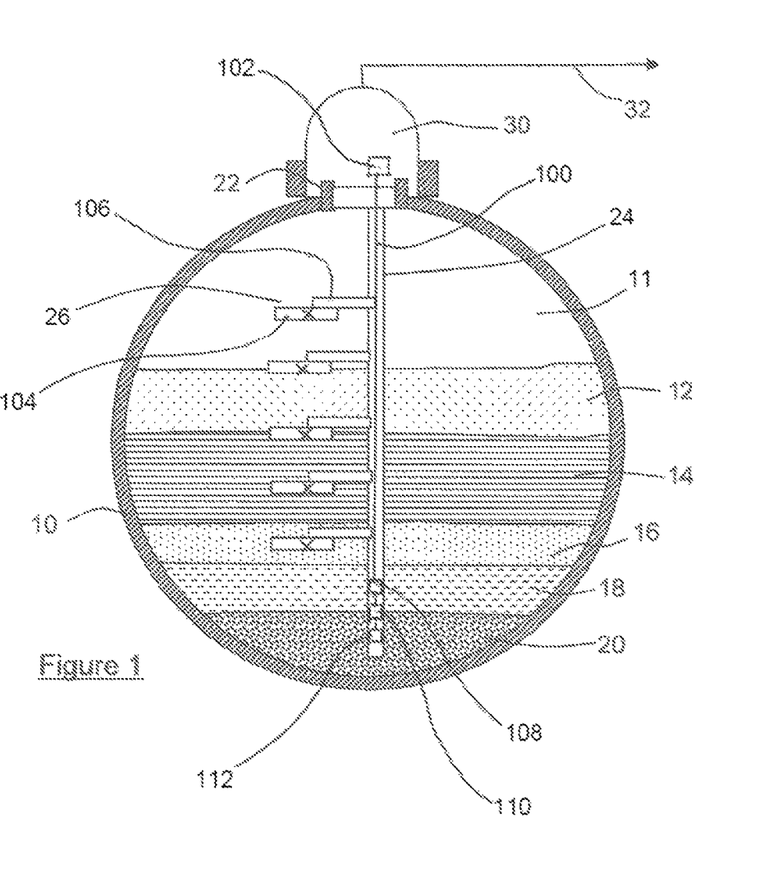
FIG. 1 is a schematic drawing of a transverse section through an oil separator vessel into which a density profiler apparatus has been installed.

In FIG. 1, such an oil separator vessel is shown by way of example of an application of the invention. The vessel 10 contains a multiphase fluid flow from an oil & gas well. The flow comprises a gas phase 11, crude oil 14, and water 18. Additional heterogeneous phases are also present, namely a foam 12 which forms between the oil and gas phases, an emulsion 16 between the oil and water and a dense lower phase 20 incorporating solid particles of sand and other heavy materials. The fluids enter the vessel through an inlet port (not shown), separate into phases under the action of gravity, and are then extracted from the vessel separately through separate outlet ports (not shown). Chemicals may be added to the fluids in order to break the foam and emulsion phases so that they separate into the desired gas, oil and water phases.

The apparatus comprises an elongate vertical support member 24 carrying a plurality of level measurement modules 26 (shown in greater detail in FIG. 2) supported in a linear arrangement along its length. Each measurement module 26 comprises a displacer 104 and a support arm 106 extending between the centre of buoyancy ("X") of the displacer (which may also be the centre of mass of the displacer) and the support member 24. The vertical support member 24 is supported by a housing 30 and sized to fit into the vessel through an inspection port 22. Electrical connections (data connection 100) run along the support member to the housing 30 to carry signals from the level measurement modules to a data processing unit 102 which in the example is located within the housing. Optical fibre 32 connects the apparatus to a control system and carries data from the data processor to a monitoring station. Alternative locations to the housing may be considered for data processing means, which may for example at least party be provided local to each level measurement module or remotely from the apparatus, at the monitoring station. The apparatus is positioned in the vessel so that the support member penetrates through the different fluid phases 11-20. The apparatus may also comprise one or more temperature sensors 108, one or more pressure sensors 110, and an accelerometer 112. The position of these components in FIG. 1 is for illustrative purposes only. As previously disclosed, the temperature and pressure sensors 108, 110 may be provided on or within each displacer 104 or provided as a separate probe. The accelerometer 112 can be placed in any suitable location to aid in correctly orientating the apparatus and detecting any acceleration of the apparatus as previously described.

Figure 2:
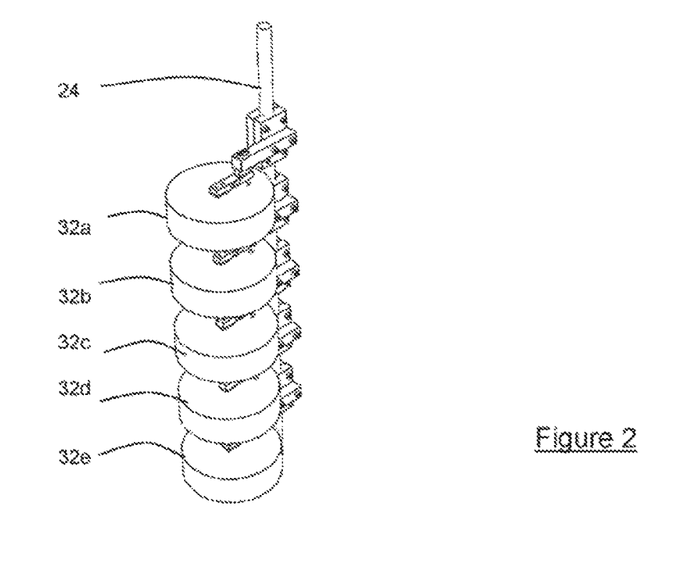
FIG. 2 shows the apparatus of FIG. 1 in more detail.

FIG. 2 shows the apparatus of FIG. 1 in greater detail. The vertically disposed support member 24 carries an array of five level measurement modules with respective displacers 32*a* to 32*e* in arrayed at intervals along part of its length, each of which is provided with a data link to be separately addressed in parallel. This forms the vertical array shown in FIG. 1 when deployed within a vessel in use.

Figure 3:
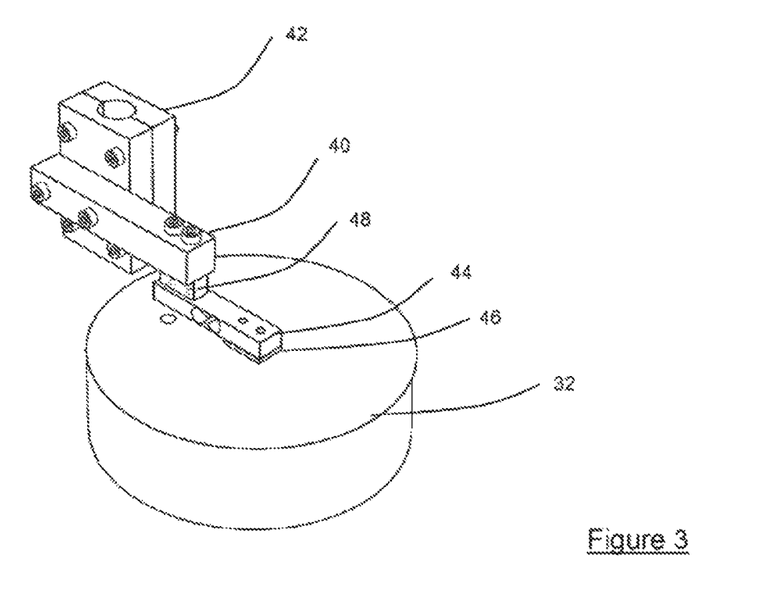
FIG. 3 shows a single density measurement module of the apparatus.

The mounting arrangement is shown in more detail in FIG. 3. A displacer 32 comprises a flat cylinder or disc of material with a buoyancy ideally relatively closely matched to the fluids in which it is to be deployed. The disc may be solid and homogenous, or a hollow shell that is liquid, gas or vacuum filled. A support arm member 40 is mounted to the vertical support member 24 via a mounting block 42 so as to extend transversely outwardly. An elongate load cell 44 has a first end connected to a distal end of the support arm member 40 and a second end mounted to the axial centre of buoyancy of the displacer 32, the mountings being effected by respective spacers 46, 48. The elongate load cell is for example a double bending beam load cell.

When the vertical array of measurement modules with respective displacers shown in FIG. 1 is deployed within a vessel in use the different fluids at each level exert a buoyancy force on an object according the weight of fluid that each displacer displaces. By measuring the resultant force of each displacer of known weight and volume placed in the vessel, it is possible to calculate the density of the fluid the object displacer sits in. A vertical array of such displacers attached to load cells as shown and placed in a fluid column of varying density will allow the density profile of the fluid to be measured.

FIG. 3 shows a single displacer. This may be used as an illustration of how each displacer of FIG. 2 may be mounted. However, it could also be representative of a further configuration in which a vertically disposed support member carries a single level measurement module at a suitable height. A possible application of such an embodiment might be as a level trip device. Known nucleonic trip systems use attenuation of radiation to measure density and provide a signal when a certain phase reaches a critical level. This configuration would provide an alternative, non-nucleonic technology to fulfil this requirement. A displacer-based trip system could be used to trigger off any density required by a system designer. This density could for example be selected to represent gas at a certain pressure, foam, liquids, emulsions or fluidised solids. The principles of a displacer-based trip system could be extended to a system having displacers at more than one level.

A further application of the foregoing arrangements might be found in level monitoring in volumes defined by other means than vessels. By way of example, it is known to pour material such as grout in subsea environments, and it its desirable to measure pour levels. When pouring grout subsea, it is not possible to see the grout level as suspended grout obscures visibility. Known nucleonic grout probes measure grout density and is used to ensure grout of sufficient density has reached a desired level. The displacer system described in this application may be used as an alternative non-nucleonic grout probe for subsea installations, detecting when poured grout has reached a desired level. It may be deployed suspended from a wire, mounted as a fixed instrument or deployed via ROV.

Figure 4:
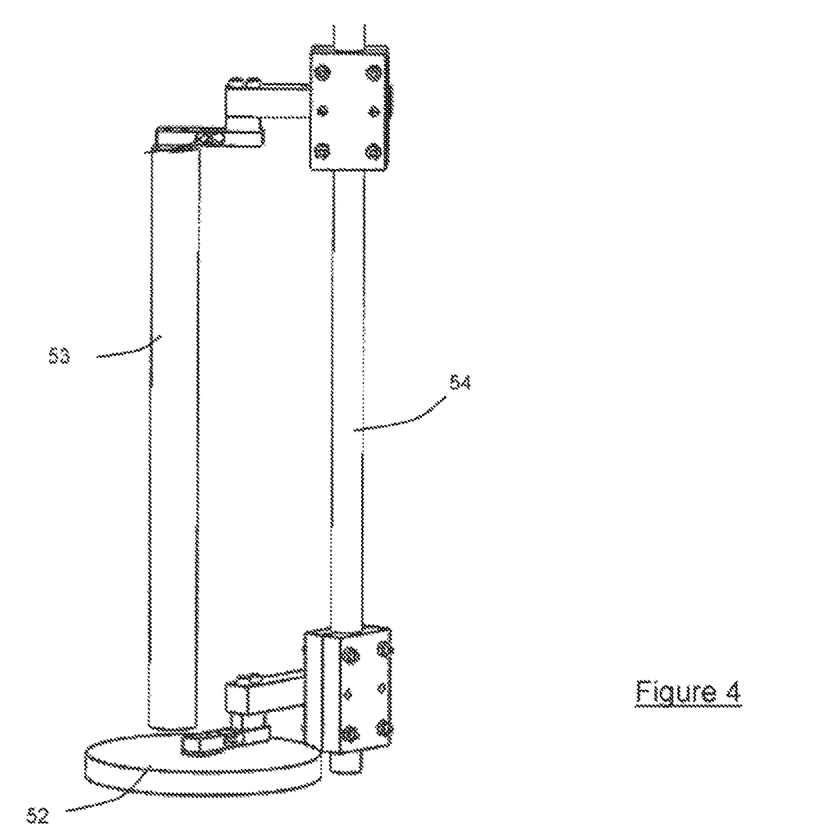
FIG. 4 shows an alternative apparatus.

FIG. 4 shows a further configuration. Where the FIG. 2 configuration used an array of identical displacers, the Figure configuration uses differently conformed displacers. A vertically disposed support member 54 carries two level measurement modules with respective displacers 52, 53, each provided with a data link to be separately addressed in parallel. This may be deployed within a vessel in use in the manner shown in FIG. 1.

The FIG. 4 configuration is distinguished in that the displacers 52, 53 are dissimilar. The first displacer 52 is a flat cylinder or disc of material like those illustrated above. However, the second displacer 53 is an elongate cylindrical rod. An elongate bar could be substituted. Multiple displacers of each type could be provided.

The configuration shown in FIG. 4 may be used to give density and level information. The first displacer 52 is located towards the bottom of the support member 54, below an intended fluid level. The second displacer 53 extends vertically for a substantial part of the height of the support member 54 to be located in use such that it extends either side of a surface of the fluid over the range of practical fluid levels. By measuring the resultant force of the first displacer, it is possible to calculate the density of the fluid. The second displacer, held static and placed such that it extends above and below the surface of the fluid, will have a resultant force which depends on how much of that object is submerged. By measuring this force and using the density measured using the first displacer, fluid depth can be calculated.

This principle could be used to get density and level information for example for trays in distillation columns providing a means of online non-nucleonic tower scanning. It offers the potential for continuous data, rather than snapshot data currently offered using nucleonic techniques. One displacer (or more for redundancy) is suspended with its base close to the bottom of a tray in a distillation column. For best results, this displacer would take the form of a flat plate or disc. A second displacer is suspended with its base above the upper most surface of the first displacer. this displacer would take the form of a rod or bar. it should extend beyond the highest level the liquid phase will reach in a tray. Additional displacers of this form may be added for accuracy, to extend the measurement range or for redundancy.

In the example arrangements above, the support arm member 40 and elongate load cell 44 together extend from a mounting point on the vertical support member 24 to a mounting point at the axial centre of buoyancy of the displacer 32 and thus the support arm member 40 and elongate load cell 44 together constitute a displacer support arm on which a displacer is carried. Alternative arrangements are possible. For example, the elongate load cell may be integrally formed with, or formed to constitute, the displacer support arm. For example, alternatively, a load cell may be mounted on or formed as part of the displacer, and for example mounted or formed at the axial centre of buoyancy of the displacer, with a support arm member extending between the axial centre of buoyancy of the displacer and the vertical support member.

Figure 5A:
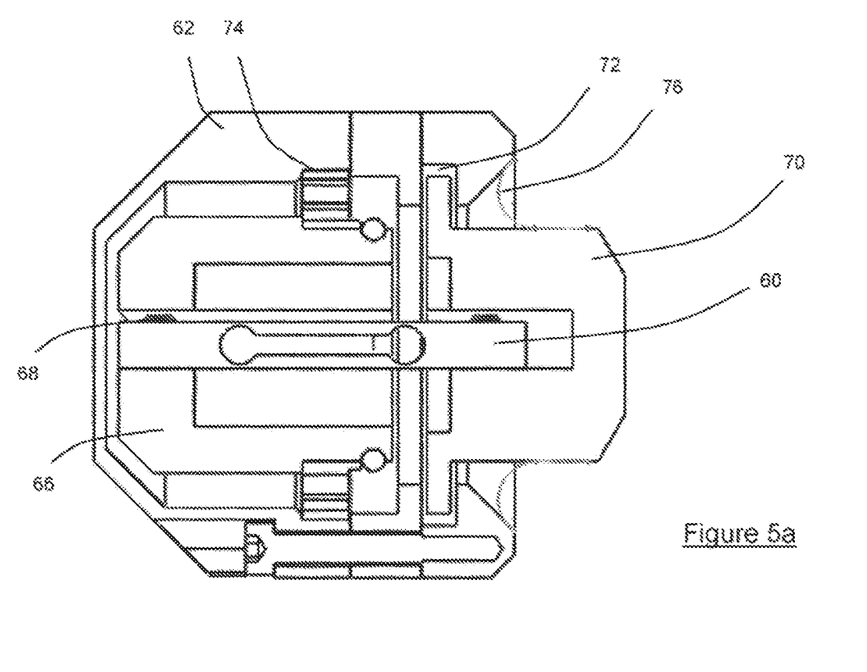
FIG. 5 shows a displacer suitable for use in an apparatus as described herein.
Figure 5B:
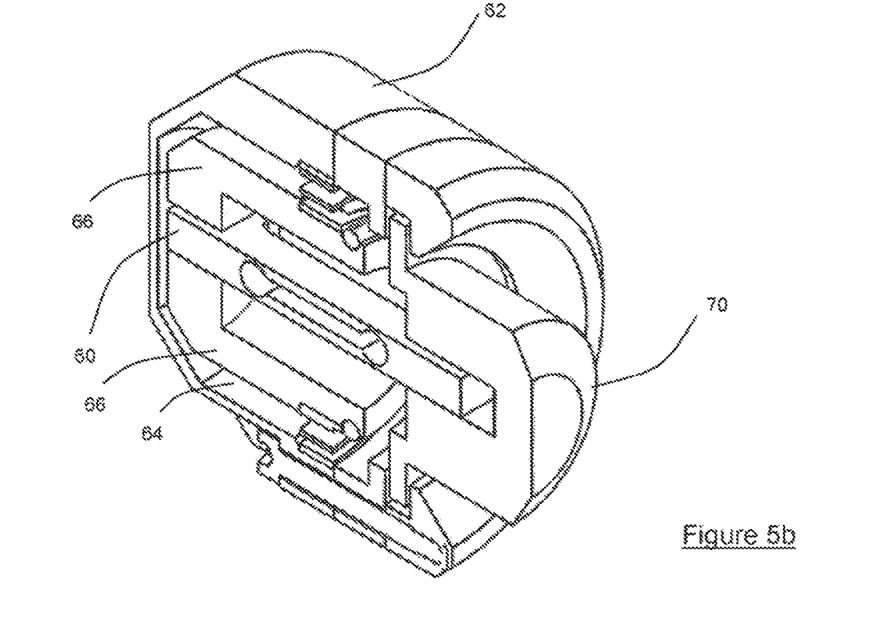

An example of such an alternative arrangement of a displacer suitable for use in an apparatus as described herein is shown in FIG. 5. In this arrangement a load cell is contained within the displacer, for example for environmental protection, as shown in FIG. 5a in vertical cross section and in FIG. 5b in perspective view.

In this embodiment the load cell 60 is contained within an environmental enclosure defined by the displacer body. The displacer comprises an annular body 62 defining a cavity 64 in which the load cell 60 is contained mounted by bolts 68 on one of two parallel mounting arms 66 to allow the necessary movement of the free end.

Amounting formation 70 provides a means by which the displacer may be attached to an elongate displacer support arm. This is not shown in the Figure, but the displacer of FIG. 5 could be mounted in generally similar manner to and used in generally similar applications to the displacers described with reference to FIGS. 1 to 4, but with a displacer support arm extending from the vertical support member to a mounting point on the displacer and with the elongate load cell of those embodiments replaced by the contained load cell of FIG. 5.

The location of the mounting formation 70 in the cavitied portion 72 defined by the housing, and the use of complaint mounts 74 together provide a degree of tolerance by means of which the assembly can accommodate larger degrees of deflection in use that might otherwise damage the load cell.

The load cell is environmentally sealed within the displacer assembly by the flexible seals 76. These are shown as sealing the apertures only in FIG. 5a and omitted from FIG. 5b for clarity. However, in a possible embodiment, the flexible seals may be extended to envelop and environmentally isolate the whole illustrated assembly, for example forming a balloon-like envelope around the illustrated assembly.

In each of these example embodiments and applications information may be obtained regarding a level and/or density of a fluid in the volume under test and/or the presence of an interface between fluids of different density at the location of the displacer(s). In each of these embodiments and applications this may be done without the need to employ nucleonic sources and without the consequent restrictions in use and/or health and safety issues associated therewith in order to ensure safe working.

Applications of the apparatus and methods as described herein can include: chemical/materials processing; oil/water separators; underwater grouting; paper/pulp processing; mining applications; monitoring of distillation columns; and monitoring of storage tanks.

While this invention has been particularly shown and described with reference to certain examples, it will be understood to those skilled in the art that various changes in form and detail may be made without departing from the scope of the invention as defined by the appended claims.

The invention claimed is:

1. An apparatus for determining a density profile of a fluid column including at least two different liquids or a fluid column including at least one liquid with a varying solid content, the apparatus comprising:

a support member;

a plurality of measurement modules spaced apart, and supported along, the support member to form an array of measurement modules; and,
a data processing unit,
wherein each measurement module comprises:
a support arm mounted to the support member and extending outwardly from the support member;
a displacer carried on the support arm;
a force measurement device configured to measure a force attributable to a mass of the displacer mediated by a buoyancy of the displacer in the fluid column,
wherein the plurality of measurement modules have a data connection to the data processing unit for transmitting measurement data from the plurality of measurement modules to the data processing unit, and
wherein the data processing unit is configured to process the measurement data from the plurality of measurement modules and generate a density profile of the fluid column.

2. The apparatus according to claim 1, wherein the displacer is configured such that its centre of buoyancy and its centre of mass are coincident being located at a common point.

3. The apparatus according to claim 1, wherein the force measurement device is an elongate load cell, wherein the first end of the elongate load cell is mounted to the support arm and a second end of the elongate load cell is mounted to the displacer.

4. The apparatus according to claim 1, wherein the data connection from the plurality of measurement modules to the data processing unit passes along, and is housed within, the support member.

5. The apparatus according to claim 1, wherein at least one the displacers is configured to have a different buoyancy to at least one of the other displacers.

6. The apparatus according to claim 1, further comprising one or more temperature sensors.

7. The apparatus according to claim 1, further comprising one or more pressure sensors.

8. The apparatus according to claim 1, further comprising an accelerometer.

9. The apparatus according to claim 1, wherein the data processing unit is configured to use the density profile to indicate a vertical level of each one liquid within the fluid column.

10. The apparatus according to claim 1, wherein the displacers have a mean density in a range 0.1 to 2 $g/cm^3$, 0.5 to 1.5 $g/cm^3$, or 0.8 to 1.0 $g/cm^3$.

11. The apparatus according to claim 1, wherein the support member is an elongate vertical support member.

12. A system comprising an oil/water separator vessel and the apparatus according to claim 1 disposed within the oil/water separator vessel.

13. A method of determining a density profile of a fluid column including at least two different liquids or a fluid column including at least one liquid with a varying solid content, the method comprising:
introducing the apparatus according to claim 1 into the fluid column;
measure a force attributable to the mass of the displacer mediated by the buoyancy of the displacer in the fluid column at each of the measurement modules;
transmitting measurement data from the plurality of measurement modules to the data processing unit, and
processing the measurement data from the plurality of measurement modules to generate a density profile of the fluid column.

14. The method according to claim 13, wherein the fluid column is a multi-layered fluid column.

15. The apparatus according to claim 1, wherein the displacer is mounted to the support arm via the force measurement device and the force measurement device is contained within the displacer.

16. The apparatus according to claim 15, wherein the force measurement device is sealed within the displacer.

17. The apparatus according to claim 1, wherein the displacer is mounted at its centre of buoyancy.

18. The apparatus according to claim 17, wherein the support arm extends between the centre of buoyancy of the displacer and the support member.

19. An apparatus for determining a density profile of a fluid column including at least two different liquids or a fluid column including at least one liquid with a varying solid content, the apparatus comprising:
a support member;
a measurement module that is movable through the fluid column; and
a data processing unit,
wherein the measurement module comprises:
a support arm mounted to the support member and extending outwardly from the support member;
a displacer carried on the support arm; and
a force measurement device configured to measure a force attributable to a mass of the displacer mediated by a buoyancy of the displacer in the fluid column,
wherein the measurement module has a data connection to the data processing unit for transmitting measurement data from the measurement module to the data processing unit, and
wherein the data processing unit is configured to process the measurement data from the measurement module and generate a density profile of the fluid column.

20. The apparatus according to claim 19, wherein the displacer is configured such that its centre of buoyancy and its centre of mass are coincident being located at a common point.

21. The apparatus according to claim 19, further comprising an accelerometer.

22. The apparatus according to claim 19, wherein the displacer has a mean density in a range 0.1 to 2 $g/cm^3$, 0.5 to 1.5 $g/cm^3$, or 0.8 to 1.0 $g/cm^3$.

23. A method of determining a density profile of a fluid column including at least two different liquids or a fluid column including at least one liquid with a varying solid content, the method comprising:
introducing the apparatus according to claim 19 into the fluid column;
measure a force attributable to the mass of the displacer mediated by the buoyancy of the displacer in the fluid column at the measurement modules that is moved through the fluid column;
transmitting measurement data from the measurement module to the data processing unit, and
processing the measurement data from the measurement module to generate a level or density profile of the fluid column.

24. The apparatus according to claim 19, wherein the displacer is mounted to the support arm via the force measurement device and the force measurement device is contained within the displacer.

25. The apparatus according to claim 24, wherein the force measurement device is sealed within the displacer.

26. The apparatus according to claim 19, wherein the displacer is mounted at its centre of buoyancy.

27. The apparatus according to claim 26, wherein the support arm extends between the centre of buoyancy of the displacer and the support member.

\* \* \* \* \*